United States Patent [19]

Rixen

[11] Patent Number: 4,811,657

[45] Date of Patent: Mar. 14, 1989

[54] ELECTRICALLY OPERATED COFFEE MAKING MACHINE

[75] Inventor: Edgar Rixen, Solingen, Fed. Rep. of Germany

[73] Assignee: Robert Krups Stiftung & Co. KG, Solingen, Fed. Rep. of Germany

[21] Appl. No.: 157,475

[22] Filed: Feb. 17, 1988

[30] Foreign Application Priority Data

Feb. 20, 1987 [DE] Fed. Rep. of Germany ....... 8702616

[51] Int. Cl.⁴ .............................................. H47J 31/00
[52] U.S. Cl. ....................................... 99/295; 99/299
[58] Field of Search ................ 99/279, 295, 306, 299, 99/304, 307; 426/433; 210/481, 474

[56] References Cited

U.S. PATENT DOCUMENTS

| | | | |
|---|---|---|---|
| 4,467,707 | 8/1984 | Amiot | 99/279 |
| 4,506,597 | 3/1985 | Karns | 99/295 |
| 4,667,587 | 5/1987 | Wunder | 99/295 |

*Primary Examiner*—Robert W. Jenkins
*Attorney, Agent, or Firm*—Peter K. Kontler

[57] ABSTRACT

An electrically operated coffee making machine wherein a filter holder for a removable filter is mounted in the housing for pivotal movement about a vertical axis between operative and inoperative positions. The handle of the filter in the filter holder is received in a recess of the housing when the filter holder assumes its operative position in which the outlet of a riser discharges hot water into the supply of comminuted coffee beans in a bag within the filter. The bottom wall of the filter has an outlet which permits freshly brewed coffee to flow through the centrally located opening of a flat cover into a coffee pot when the latter rests on a heating platform on the base of the housing. A pivotable valving element is biased by a spring to seal the outlet in the bottom wall of the filter when the pot and its cover are removed, and a pivotable actuator is mounted in the housing below the recess to pivot the valving element to open position as soon as it is engaged by the flat upper side of the cover, i.e., when the pot is placed onto the heating platform.

12 Claims, 4 Drawing Sheets

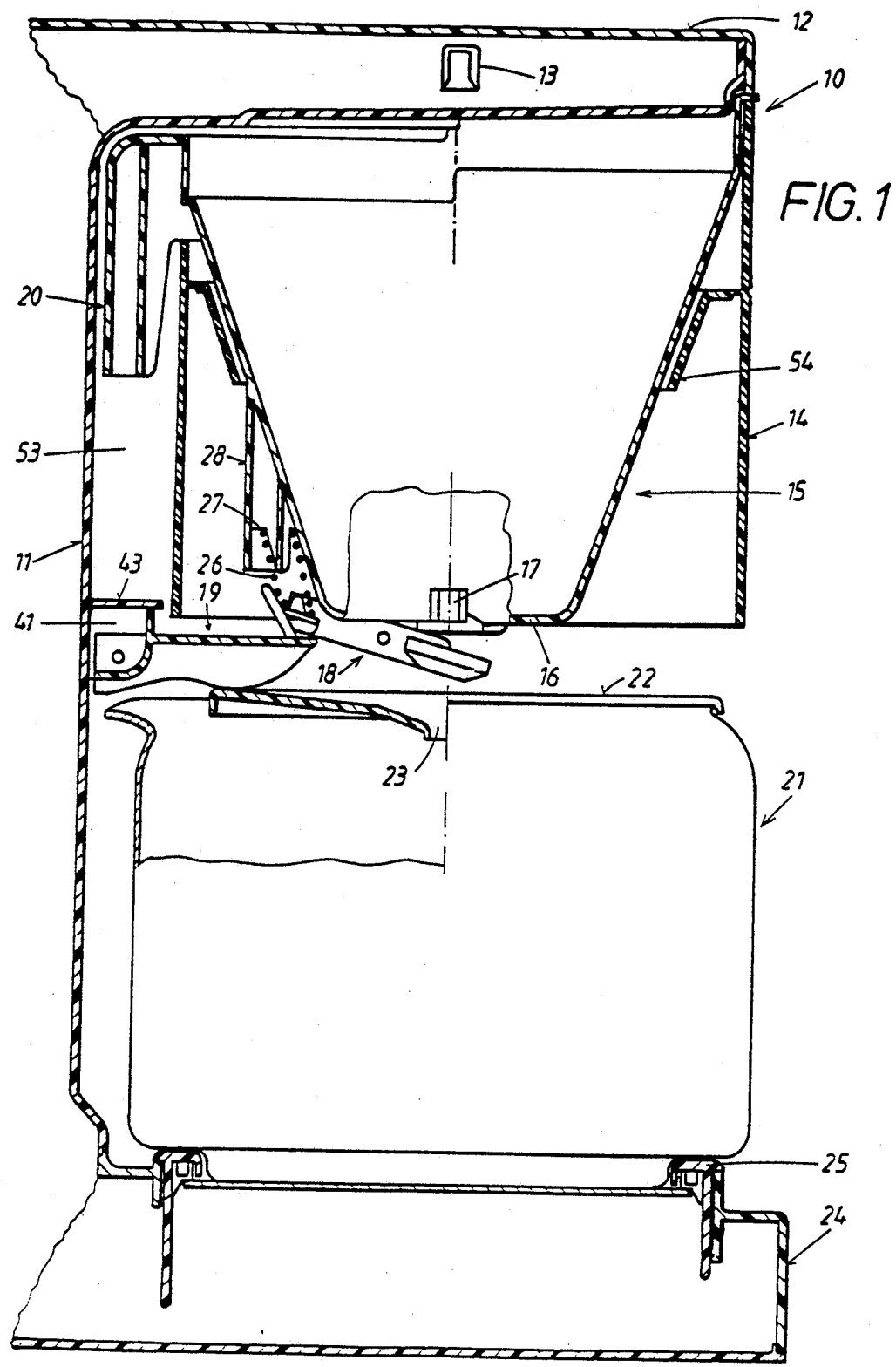

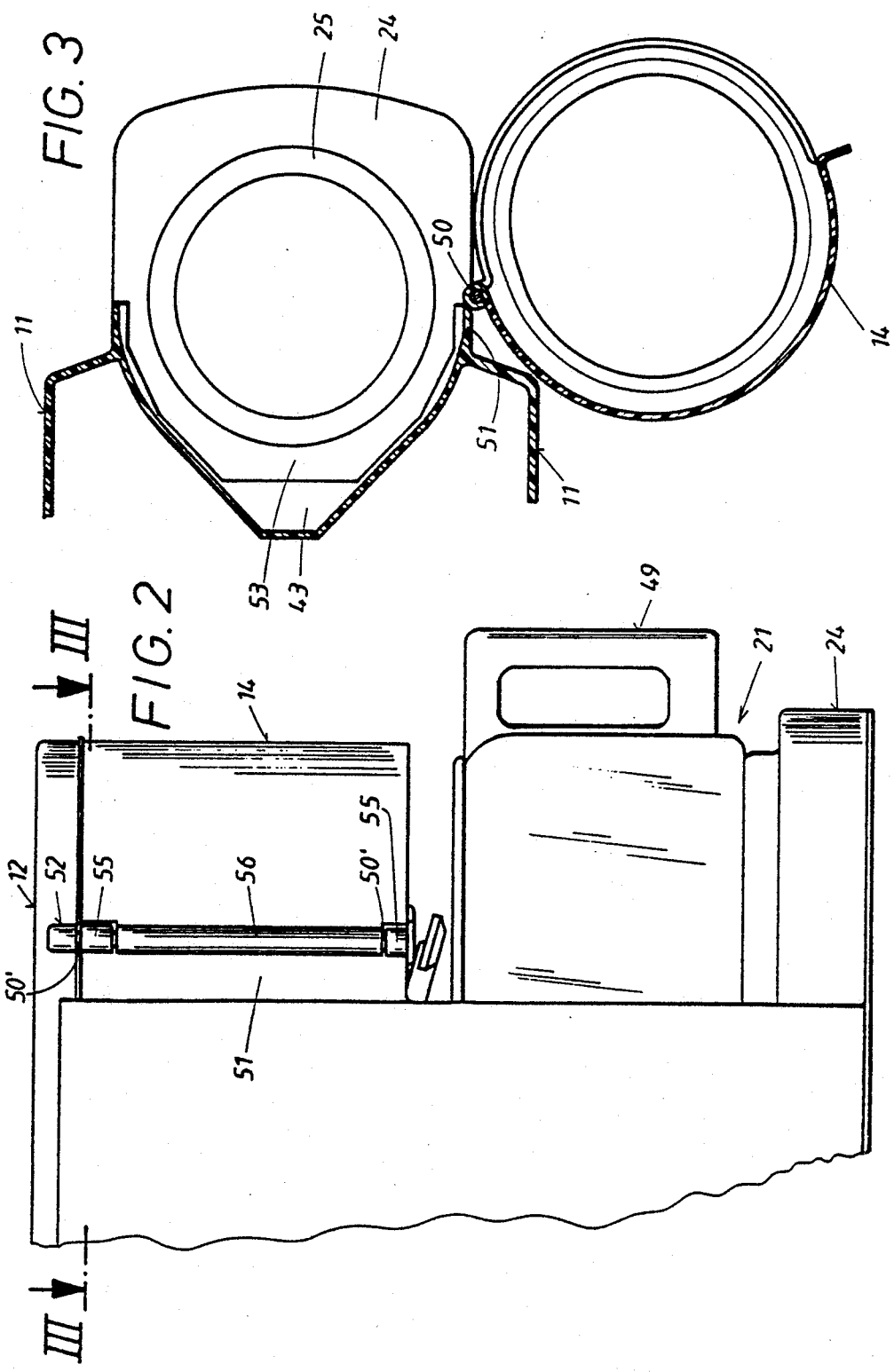

ELECTRICALLY OPERATED COFFEE MAKING MACHINE

BACKGROUND OF THE INVENTION

The invention relates to improvements in electrically operated coffee making machines, and more particularly to improvements in coffee making machines of the type wherein a filter holder is movably mounted in the housing and can receive a removable filter having a handle which facilitates insertion of the filter into or its removal from the filter holder. Coffee making machines of such character are described and shown, for example, in a brochure entitled "KRUPS 10 YEARS IN AMERICA—QUALITY BY DESIGN 86/87" which is distributed by the assignee of the present application.

A drawback of certain presently known coffee making machines with filter holders for removable filters is that the handle of the filter projects from the filter holder as well as from the housing in each position of the filter holder. This not only affects the appearance of the machine but is also likely to cause accidents, especially overturning of the entire machine. For example, a sleeve, an apron or another portion of the garment of the operator of the coffee making machine is likely to accidentally engage the handle to upset the machine or to actually sweep the machine off its support. This can entail contamination of and/or other damage to the surrounding area as well as serious injury to the person or persons nearby, especially if the base of the housing of the coffee making machine supports a partly or completely filled vessel for hot coffee.

OBJECTS AND SUMMARY OF THE INVENTION

An object of the invention is to provide a novel and improved coffee making machine wherein the filter and its handle are less likely to cause injury and/or to contaminate the surrounding area than in heretofore known coffee making machines.

Another object of the invention is to provide a novel and improved housing for the above outlined coffee making machine.

A further object of the invention is to provide novel and improved means for movably coupling the filter holder to the housing of the coffee making machine.

An additional object of the invention is to provide a coffee making machine which is less likely to be upset or to be swept off its support as a result of accidental engagement of the garment or a hand of the operator than heretofore known coffee making machines.

Still another object of the invention is to provide a coffee making machine which is of eye-pleasing appearance, which permits full confinement of the filter holder and of the filter therein when the machine is in actual use, and wherein the outlet of the filter can be automatically sealed, when necessary, in a simple and effective manner.

A further object of the invention is to provide novel and improved sealing means for the filter in the above outlined coffee making machine.

An additional object of the invention is to provide a coffee making machine wherein the filter holder is reliably coupled to the housing and is capable of moving to a position for unimpeded removal or insertion of the filter.

Another object of the invention is to provide a novel and improved method of manipulating and concealing the filter in a coffee making machine of the above outlined character.

The improved coffee making machine comprises a housing, a filter holder, means for coupling the filter holder to the housing so that the filter holder is movable relative to the housing between operative and inoperative positions, and a filter which is removably installed in the filter holder and has a handle extending from the holder. The housing has a recess which receives the handle in the operative position of the filter holder. The coupling means preferably comprises a hinge which defines a substantially vertical axis for pivotal movement of the filter holder between operative and inoperative positions. The filter is removable from and reinsertable into the filter holder when the latter assumes its inoperative position. The arrangement is preferably such that the filter holder and the filter therein are located within the confines of the housing when the filter holder assumes its operative position.

The housing can be provided with a protuberance (e.g., in the form of an integral ledge) which is disposed below the recess for the handle of the filter. The latter has a bottom portion with an outlet for brewed coffee, and the machine further comprises means for sealing the outlet when the housing does not support a coffee collecting vessel below the filter holder (in the operative position of the filter holder). The sealing means includes a valve actuator and means for movably connecting the actuator to the housing in the region of the protuberance. The connecting means can include at least one hinge which is disposed at a level below the protuberance and defines a substantially horizontal pivot axis for the actuator.

The housing is preferably formed with a wall which extends forwardly from its front side (i.e., from that side which faces the filter holder when the latter assumes its operative position). The coupling means for the filter holder is provided on such forwardly extending wall of the housing. The wall can be provided with two vertically spaced apart sockets (e.g., in the form of bosses) and the coupling means can comprise two relatively short coaxial pintles each of which extends in part into one of the sockets and in part into the filter holder. The pintles define the aforementioned substantially vertical axis for pivotal movement of the filter holder between its operative and inoperative positions. The housing preferably further comprises an arm (preferably in the form of a cantilever) which overlies the wall and has a hole or bore for a portion of the upper pintle of the coupling means. The filter holder includes a portion (e.g., in the form of an elongated sleeve having a circular outline) which is disposed between the sockets of the wall and has a cross-sectional outline at least substantially matching those of the sockets. This enhances the appearance of the coupling means and of the entire machine.

The arrangement is preferably such that the filter holder is pivotable relative to the wall through an angle of at least 180 degrees. This invariably ensures that the filter can be inserted into and removed from the filter holder when the latter is caused to assume its inoperative position. In accordance with a presently preferred embodiment, the filter holder is disposed at one side of the wall in its operative position and at the other side of the wall in its inoperative position.

The recess is preferably provided in the front side of the housing at one side of the wall.

The novel features which are considered as characteristic of the invention are set forth in particular in the appended claims. The improved coffee making machine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a side elevational view of a coffee making machine which embodies one form of the invention, a portion of the housing being broken away and the illustrated portion of the housing, as well as the filter holder and the filter therein, being shown in a vertical sectional view;

FIG. 2 is a smaller-scale fragmentary elevational view of the coffee making machine with the filter holder shown in the operative position, the same as in FIG. 1;

FIG. 3 is a horizontal sectional view as seen in the direction of arrows from the line III—III of FIG. 2, showing the filter holder (without the filter) in its inoperative position;

DESCRIPTION OF THE PREFERRED EMBODIMENTS

Figure 4:
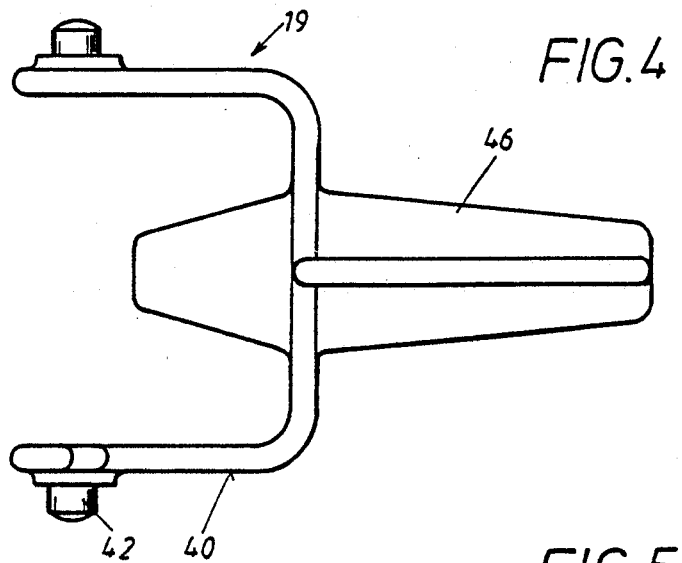
FIG. 4 is an enlarged bottom plan view of an actuator for the valving element of the sealing means for the filter in the coffee making machine of FIGS. 1 to 3.

Referring first to FIGS. 1 to 3, there is shown an electrically operated coffee making machine 10 which comprises a housing 11, a filter holder 14 and a filter 15 with a handle 20. For the sake of clarity, the upper part of FIG. 1 shows the left-hand and right-hand portions of the structure which is illustrated therein turned through 90 degrees relative to each other. The drawing merely shows those parts of the improved machine which are necessary for an understanding of the invention; all other parts (including the means for heating a coffee pot 21 (which is preferably made of a light-transmitting material), the tank for fresh water, the riser which conveys hot water to the filter 15, and the controls for electrical and/or electronic components of the machine) can be constructed and assembled in the same way as in conventional coffee makers, e.g., in those disclosed in the aforementioned brochure of the assignee.

The left-hand portion (not shown in FIGS. 1 and 2) of the housing 11 contains the fresh water tank (such tank is adjacent the rear side of the housing) and the aforementioned riser which conveys hot water to the filter 15 in the filter holder 14. The riser extends into a cantilever-type overhead arm 12 of the housing 11 and has an outlet 13 serving to discharge hot water into the supply of comminuted (e.g., pulverized) coffee beans in a filter paper bag in the interior of the substantially funnel-shaped filter 15 in the filter holder 14. The arrangement is preferably such that, when the filter holder 14 is maintained in its operative position (within the confines of the housing 11), the outlet 13 of the riser is disposed substantially centrally of and above the open top of the filter 15 and of the filter paper bag therein. Hot water flows through the mass of comminuted coffee in the bag and issues by way of an outlet 17 provided in the central portion of a substantially horizontal bottom wall 16 of the filter 15. As a rule, the filter 15 is made of a suitable plastic material and is removably received, in a predetermined angular position, in the interior of the filter holder 14 in such a way that, when the filter holder is moved to and is maintained in the operative position of FIGS. 1 and 2, the handle 20 of the filter 15 is fully received in a recess 53 provided therefor in the front side of the housing 11 at one side of an upright wall 51 (see particularly FIG. 3) which extends forwardly from the front side of the major part of the housing 11. Confinement of the handle 20 in the recess 53 not only contributes to the eye-pleasing appearance of the coffee making machine 10 (when the filter holder 14 is maintained in the operative position at one side of the wall 51) but this also reduces the likelihood of accidental overturning of the machine 10 and spilling of hot coffee onto the person or persons nearby or onto the support for the base or foot 24 of the housing 11 and/or onto the floor. The internal surface of the hollow tubular filter holder 14 is provided with two or more circumferentially spaced apart brackets 54 or other suitable means for locating and supporting the filter 15 in properly inserted position (namely in proper position as concerns the level of the filter as well as concerns the angular position of the filter with reference to the filter holder 14) so that the handle 20 automatically enters the recess 53 in the front side of the housing 11 when the filter holder 14 is caused to assume the operative position of FIGS. 1 and 2 in which the outlet 13 of the riser is located above the open top of the filter 15 (actually, the open top of the filter 15 is located beneath the outlet 13 because the latter is not or need not be movable relative to the housing 11).

Figure 8:
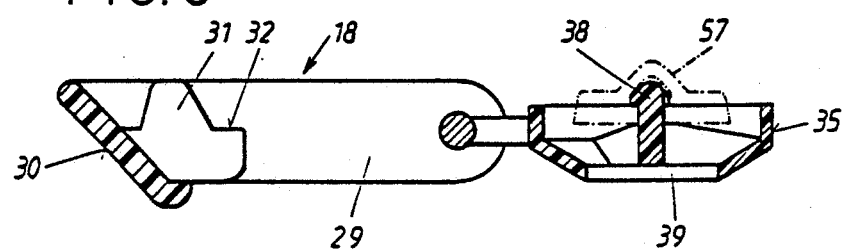
FIG. 8 is a central vertical sectional view of the valving element, the elastic filter-engaging portion of the valving element being indicated by phantom lines.

The outlet 17 of the bottom wall 16 of the properly inserted filter 15 can be sealed by a composite sealing device (including a pivotable valving element 18 and an actuator 19 for the valving element) as long as the annular heating platform 25 on the base 24 of the housing 11 does not support a coffee pot 21 and the top of the pot 21 is not closed by a substantially flat horizontal cover or lid 22. The latter has a central inlet opening 23 for admission of freshly brewed coffee which flows from the interior of the filter 15 by way of the outlet 17 in the bottom wall 16. The cover 22 causes the actuator 19 to maintain the valving element 18 in open position (in which an elastic plug 57 which is shown in FIG. 8 by phantom lines is remote from the outlet 17) as long as the pot 21 rests on the heating platform 25 and the top of the pot 21 carries the lid 22; however, the actuator 19 cannot prevent the valving element 18 from causing the elastic plug 57 to seal the outlet 17 as soon as the pot 21 is removed from the platform 25 or when the pot is placed onto the platform 25 without a lid 22 thereon. The base 24 is preferably hollow and can contain a conventional heating unit so as to prevent rapid cooling of coffee in the pot 21 on the platform 25. The pot 21 is provided with a handle 49 (FIG. 2) which is affixed (e.g., riveted and/or bonded) to the liquid-containing portion of the pot in a well known manner not forming part of the present invention.

FIG. 3 shows that the filter holder 14 is pivotable relative to the wall 51 of the housing 11 about a substantially vertical axis (defined by a coupling device 50 the details of which can be seen in FIG. 2) between the operative position above the coffee pot 21 (not shown in FIG. 3) on the platform 25 of the base 24 and an inoperative or exposed position at the outer side of the wall 51. The configuration of the wall 51 is preferably such that the filter holder 14 can pivot through an angle of at least 180 degrees. The filter 15 and its handle 20 are not shown in FIG. 3 for the sake of clarity. The coupling device 50 is located at a level below and preferably close to the arm 12 (which overlies the wall 51 of the housing 11), and the coupling device preferably comprises two relatively short spaced-apart coaxial pintles 50' (FIG. 2). The lower pintle 50' is received in part in a first boss-shaped socket 55 of the wall 51, and the upper pintle 50' is received in part in a similar boss-like socket 55 which is also provided on the wall 51 and is adjacent the underside of the arm 12. The arm 12 has a bore or hole (not specifically shown) provided in a bearing 52 and serving to receive the topmost portion of the upper pintle 50'. During assembly of the coupling device 50, the upper end of the bore or hole in the bearing 52 is open so that the upper pintle 50' can be inserted from the upper side of such bearing. The lowermost portion of the upper pintle 50' and the topmost portion of the lower pintle 50' extend into the respective ends of a sleeve-like portion 56 of the filter holder 14. The portion 56 is located between the sockets 55 of the wall 51 and its cross-sectional outline preferably matches or resembles those of the sockets 55 to thus enhance the appearance of the holder 14, of the wall 51 and of the entire coffee making machine 10. The lower socket 55 of the wall 51 is adjacent the working end of the pivotable valving element 18. While it is possible to replace the two discrete (relatively short) pintles 50' with a single elongated pintle, the illustrated design is preferred because it contributes to a reduction of cost and simplifies the installation of the composite pintle in the wall 51 and arm 12 of the housing 11. The pintles 50' are preferably more or less permanently anchored in their properly inserted positions so as to greatly reduce or eliminate the possibility of accidental separation of the filter holder 14 from the wall 51 of the housing 11. Moreover, such more or less permanent anchoring reduces the likelihood of losing the one and/or the other pintle 50' during cleaning or shipment of the machine 10.

Figure 7:
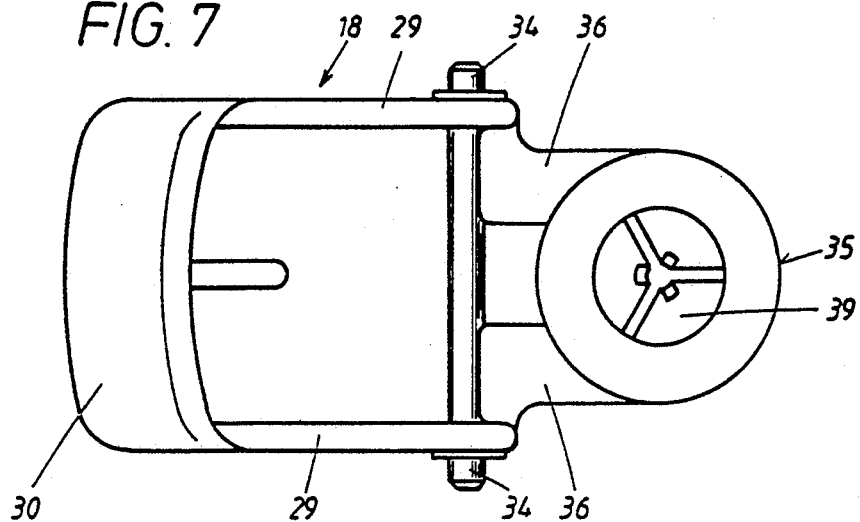
FIG. 7 is a bottom plan view of the valving element of the sealing means.
Figure 9:
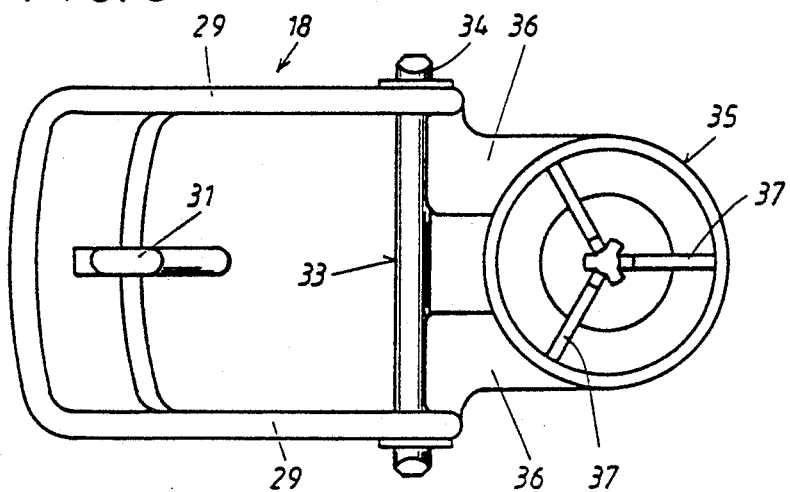
FIG. 9 is a top plan view of the valving element.

FIG. 1 shows the sealing device 18, 19 in the inoperative or idle position in which the valving element 18 does not interfere with the flow of freshly brewed coffee from the filter 15 into the pot 21 by way of the inlet opening 23 in the lid 22. The valving element 18 is shown in detail in FIGS. 7 to 9. It comprises a substantially U-shaped frame with two parallel legs 29 and a web 30 which connects the rear portions of the legs to each other. The entire valving element 18 (preferably with the exception of the elastic plug 57) can be made of a single piece of suitable plastic material, and the front end portions of the legs 29 carry outwardly extending coaxial stubs 34 which form part of a shaft 33 and are received in complementary bores or holes in adjacent portions of the filter 15 so that the valving element 18 is pivotable about a substantially horizontal axis.

The central portion of the web 30 carries a projection 31 which extends forwardly toward the filter 15 in the filter holder 14 and is adjacent a supporting surface 32 serving as an abutment for the lowermost convolution of a coiled tension spring 26 (FIG. 1) which reacts against a retainer 27 on an external extension 28 of the filter 15. The projection 31 tapers upwardly and is received in one or more lowermost convolutions of the coil spring 26 so as to reduce the likelihood of buckling of the spring in response to pivoting of the valving element 18 about the horizontal axis which is defined by the shaft 33 and its studs 34. When the spring 26 is properly installed, its lowermost convolutions receive the projection 31 and its uppermost convolutions receive a portion of the retainer 27 whereby the valving element 18 tends to pivot in a counterclockwise direction (as viewed in FIGS. 1 or 8) in order to maintain the elastic plug 57 in sealing engagement with the outlet 17 in the bottom wall 16 of the filter 15. The plug 57 is removably mounted on a set of three equidistant radially extending ribs 37 forming part of a cupped round support 35 with a centrally located upright stud 38 which is integral with the radially innermost portions of the ribs 37 and has a mushroom-shaped head adapted to snap into a socket in the underside of the elastic plug 57. This prevents accidental separation of the plug 57 from the valving element 18. The support 35 resembles a shallow cup having a circular outline and a central opening 39 in its bottom wall. The support 35 is integrally secured to the frame (including the legs 29 and web 30) of the valving element 18 by two connecting elements 36.

The coil spring 26 permanently urges the valving element 18 toward the operative or sealing position in which the plug 57 bears against and seals the outlet 17 in the bottom wall 16 of the filter 15.

Figure 5:
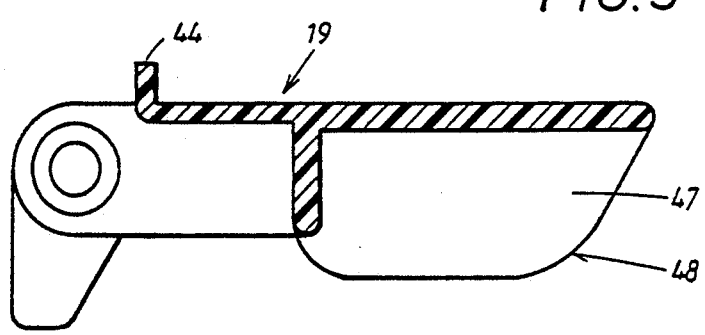
FIG. 5 is a central vertical sectional view of the actuator.
Figure 6:
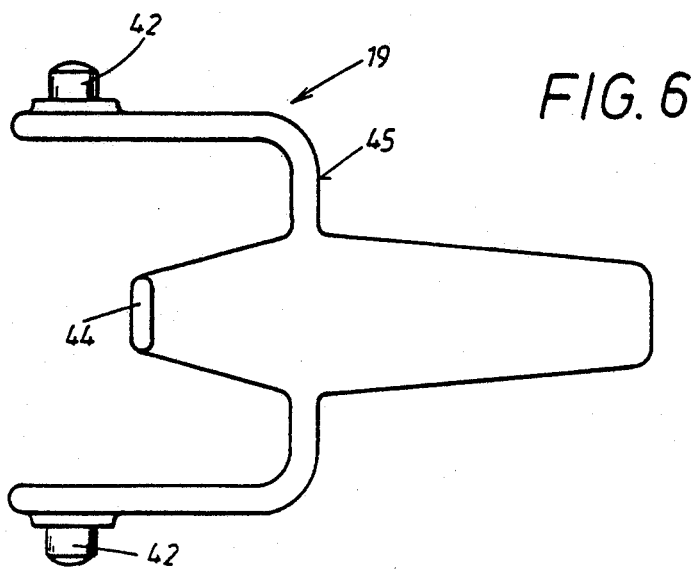
FIG. 6 is a top plan view of the actuator.

The actuator 19 for the valving element 18 is a lever which is shown in FIGS. 4 to 6 and has a U-shaped portion 40 with two substantially parallel legs whose free end portions carry coaxial outwardly extending stubs 42 serving as a means for pivotally securing the rear end portion of the actuator to the housing 11 at a level below a ledge-like substantially horizontal protuberance 43 extending from the front side of the housing 11 between two bearing plates 41 (only one shown in FIG. 1) each of which has a socket (e.g., a hole or bore) for the respective stub 42. The entire actuator 19 can be made of a single piece of plastic material, and the web 45 of its U-shaped portion 40 carries a centrally located top plate 46 with an upwardly extending abutment 44 which can strike the protuberance 43 from below in the idle position of the valving element 18 (see FIG. 1) to limit the extent of pivotability of the valving element 18 from its sealing position. The protuberance 43 constitutes a stop for the abutment 44 and is located at the lower end of the recess 53 for the handle 20 of the filter 15. The parts 41 and 43 can constitute integral portions of the housing 11. The abutment 44 extends at right angles to the top plate 46 of the actuator 19, and such top plate carries at its underside a follower 47 having a convex edge face 48 which can be engaged by the flat or substantially flat upper side of the lid 22 on a pot 21 so that the foremost portion of the plate 46 bears against and pivots the left-hand arm of the valving element 18 (the latter can be said to constitute a two-armed lever) whereby the valving element 18 causes the coil spring 26 to store energy while the sealing plug 57 moves downwardly and away from the outlet 17 in the bottom wall 16 of the filter 15. Thus, by placing the pot 21 (with a lid 22 properly applied thereto) onto the platform 25 of the base 24, the person in charge automatically causes a pivoting of the valving element 18 and plug 57 to inoperative or idle position so that freshly brewed coffee can flow from the filter 15 into the pot 21. The follower 47 can constitute a simple rib which is integral with the top plate 46. The plane of the top plate 46 makes an angle of 90 degrees with the plane of the follower 47. The spring 26 is free to expand and to pivot the valving element 18 to its operative or sealing position as soon as the pot 21 is removed from the base 24, i.e., as soon as the upper side of the lid 22 is moved away from the actuator 19. This prevents freshly brewed coffee from dripping out of the filter 15 and onto the base 24 of the housing 11.

An advantage of the sealing device including the parts 18, 19 is that the overall height of the coffee making machine 10 can be reduced because the parts 18, 19 occupy little room between the filter 15 and the pot 21. In addition, the actuator 19 can be pivoted to move the valving element 18 to sealing position by a simple flat lid 22 which need not be provided with a centrally located dome as is customary in conventional coffee making machines. It has been found that the mounting of actuator 19 at the general level of the valving element 18 also contributes to compactness (particularly to a reduction of the height) of the machine 10. As can be seen in FIG. 1, the lid 22 can be located in immediate or very close proximity to the bottom wall 16 of the filter 15 so that the distance of the arm 12 from the platform 25 need not appreciably exceed the combined height of the pot 21 (with lid 22) and the filter holder 14.

The improved coffee making machine 10 can be modified without departing from the spirit of the invention. For example, the valving element 18 and/or the actuator 19 therefor can be constructed, configurated and/or mounted in a number of different ways as long as such parts of the sealing device occupy little room between the filter 15 and the base 24 and as long as the actuator 19 can automatically deactivate the valving element 18 in response to placing of a pot 21 with lid 22 onto the platform 25, and as long as the actuator 19 allows the spring 26 (or a different spring or two or more discrete springs) to automatically return the valving element 18 to sealing position when the lid 22 is disengaged from the actuator 19. For example, the valving element 18 (or an analogous valving element) and/or the actuator 19 can be mounted on the filter holder 14, the actuator 19 can be mounted on the filter 15 or the valving element 18 can be mounted in the housing 11. It is preferred to employ a two-piece sealing device, i.e., a device wherein the lid 22 on the pot 21 need not come in direct contact with the valving element of the sealing device. An advantage of such design of the sealing device is that the lid 22 need not be provided with the aforementioned centrally located dome which necessitates the placing of the arm 12 at a greater distance from the base 24 of the housing 11. Thus, a simple flat lid 22 suffices to induce the actuator 19 to effect a movement of the valving element 18 to idle position in automatic response to placing of the pot 21 (with a flat lid thereon) onto the platform 25.

It is further possible to replace the illustrated handle 20 of the filter 15 with a differently configurated handle. All that counts is to ensure that the handle does not project from (or does not extend well beyond) the housing 11 when the filter holder 14 is caused or allowed to assume its operative position. Full or at least substantially full concealment of the handle 20 in such position of the filter holder 14 is preferred on the additional ground that this contributes to the eye-pleasing appearance of the entire machine.

It is also possible to omit the wall 51 and to mount the coupling means 50 for the filter holder 14 in a different way, or to employ a differently configurated and/or dimensioned wall as a support for the coupling means. As already mentioned above, it is possible to replace the two pintles 50' of the coupling means 50 with a single elongated pintle, shaft or a like part. Moreover, the sockets 55 of the wall 51 and the bearing 52 of the arm 12 can be replaced with other types of means for anchoring portions of the pintles 50'.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A coffee making machine comprising a housing; a filter holder; means for coupling said filter holder to said housing so that the filter holder is movable relative to the housing between operative and inoperative positions; and a filter provided in said filter holder and having a handle extending from said holder, said housing having a recess which receives at least a portion of said handle in the operative position of said filter holder so that said portion of said handle is concealed in said housing.

2. The machine of claim 1, wherein said housing has a front side and a rear side and a wall extending from said front side, said coupling means being provided on said wall.

3. The machine of claim 1, wherein said housing has a front side and a rear side and said recess is provided in said front side.

4. A coffee making machine comprising a housing; a filter holder; means for coupling said filter holder o said housing so that the filter holder is movable relative to the housing between operative and inoperative positions, said coupling means including at least one hinge defining a substantially vertical axis for pivotal movement of said filter holder between operative and inoperative positions; and a filter provided in said filter holder and having a handle extending from said holder, said housing having a recess which receives at least a portion of said handle in the operative position of said filter holder and said filter holder being removable from and reinsertable into said said filter holder in the operative position of said filter holder.

5. The machine of claim 4, wherein said filter holder and the filter therein are located within the confines of said housing in the operative position of said filter holder.

6. A coffee making machine comprising a housing; a filter holder; means for coupling said filter holder to said housing so that the filter holder is movable relative to the housing between operative and inoperative positions; a filter provided in said filter holder and having a handle extending from said holder and a bottom portion with a coffee outlet, said housing having a recess which receives at least a portion of said handle in the operative position of said filter holder and said housing including a protuberance below said recess; and means for sealing said outlet including an actuator and means for movably connecting said actuator to said housing in the region of said protuberances.

7. The machine of claim 6, wherein said connecting means includes at least one hinge at a level below said protuberance.

8. A coffee making machine comprising a housing having a front side and a rear side and a wall extending from said front side, said wall having two vertically spaced apart sockets; a filter holder; means for coupling said filter holder to said housing so that the filter holder is movable relative to the housing between operative and inoperative positions, said coupling means being provided on said wall and comprising two coaxial pintles each extending in part into one of said sockets and in part into said filter holder, said pintles defining a substantially vertical axis for pivotal movement of said filter holder between operative and inoperative positions; and a filter provided in said filter holder and having a handle extending from said holder, said housing having a recess which receives at least a portion of said handle in the operative position of said filter holder.

9. The machine of claim 8, wherein said pintles include an upper pintle and a lower pintle, said housing further comprising an arm overlying said wall and having a hole for a portion of said upper pintle.

10. The machine of claim 87, wherein said filter holder comprises a portion disposed between said sockets and having a cross-sectional outline at least substantially matching those of said sockets.

11. A coffee making machine comprising a housing having a front side and a rear side and a wall extending from said front side; a filter holder; means for coupling said filter holder to said housing so that the filter holder is movable relative to the housing between operative and inoperative positions, said coupling means being provided on said wall and defining for the filter holder a substantially vertical pivot axis, said filter holder being pivotable about such axis through an angle of at least 180 degrees; and a filter provided in said filter holder and having a handle extending from said holder, said housing having a recess which receives at least a portion of said handle in the operative position of said filter holder.

12. The machine of claim 11, wherein said filter holder is disposed at one side of said wall in the operative position and at the other side of said wall in the inoperative position thereof.

* * * * *